United States Patent

[11] 3,585,586

[72] Inventors Samuel T. Harmon;
David E. Klingler, both of Ann Arbor, Mich.
[21] Appl. No. 756,007
[22] Filed Aug. 28, 1968
[45] Patented June 15, 1971
[73] Assignee Datamax Inc.
Ann Arbor, Mich.
Continuation-in-part of application Ser. No. 642,118, May 29, 1967.

[54] FACSIMILE TRANSMISSION SYSTEM
23 Claims, 6 Drawing Figs.

[52] U.S. Cl. .................... 340/146.1, 178/5, 325/38, 325/41
[51] Int. Cl. .................... G08c 25/00, H04m 11/00
[50] Field of Search .................... 340/146.1; 178/5, 6; 325/38, 41, 42

[56] References Cited
UNITED STATES PATENTS

| | | | |
|---|---|---|---|
| 2,956,124 | 10/1960 | Hagelbarger | 340/146.1 X |
| 3,243,507 | 3/1966 | Macovski | 178/6 |
| 3,369,229 | 2/1968 | Dorros | 325/38 X |
| 3,377,423 | 4/1968 | Lippel | 178/6 |
| 3,402,393 | 9/1968 | Massey | 340/146.1 X |
| 3,484,547 | 12/1969 | Schaeffer | 325/41 X |
| 3,492,578 | 1/1970 | Gerrish et al. | 325/42 |

*Primary Examiner*—Malcolm A. Morrison
*Assistant Examiner*—Charles E. Atkinson
*Attorney*—Hauke, Krass, Gifford and Patalidis

ABSTRACT: A facsimile transmission system includes a transmitter wherein copy is scanned and a two-value digitized signal is generated. The signal is redundantly encoded and the encoded signal is converted into parallel form and time interleaved. The output of the interleaver is used to generate an analog pulse width modulated signal which is provided to a receiver over a transmission channel. At the receiver the analog signal is converted into a digital form, passed through a complimentary interleaver and back into serial form, and is decoded to detect and correct errors in the transmission before being provided to a facsimile receiver.

INVENTORS

SAMUEL T. HARMON,
DAVID E. KLINGLER.

BY Hauke, Krass, Hefford, & Paladidis
ATTORNEYS

INVENTORS
SAMUEL T. HARMON,
DAVID E. KLINGLER.
BY Hauke, Krass, Gifford, & Patalidis
ATTORNEYS

INVENTORS
SAMUEL T. HARMON
DAVID KLINGLER

BY Hauke, Krass, Gifford, & Patalidis
ATTORNEYS

FACSIMILE TRANSMISSION SYSTEM

Cross Reference to Related Application

This application is a continuation-in-part of U.S. Ser. no. 642,118 filed May 29, 1967 by Samuel T. Harmon and entitled "Sequential Decoder."

BACKGROUND OF THE INVENTION

1. Field of the Invention

This invention relates to systems for providing facsimiles of typographic or line copy at a remote location by photoelectrically scanning the original, generating digital signals proportional to the photoelectric output, processing the signals in a digital manner and transmitting them to a remote location where they are again processed and used to energize a pen scanning a sheet of paper in synchronism with the transmitter scan.

2. Prior Art

Facsimile systems for the reproduction of two dimensional graphic information at a location remote from the original generally employ a photoelectric detector which scans the surface of the original and produces an electrical output signal which varies in amplitude in accordance with the shade of the points being instantaneously scanned. This signal is transmitted to the receiver where the instantaneous shade of the marking made by a pen on a sheet is controlled so as to produce a "facsimile" of the original copy.

The present state of development of facsimile transmitters and receivers is such that the rate at which the units operate is often limited by the ability of the communication channel connecting the transmitter and receiver to convey signals of the type produced by the transmitter. For example, facsimile transmitters and receivers are presently available which can handle an entire page of typographic or line drawing in less than 3 minutes. However, the electrical output of the transmitter must be slowed to less than half its maximum speed in order to limit the distortion to an acceptable level when a telephone line is used to connect the transmitter and the receiver.

All communication channels such as radio systems, telephone lines and the like have maximum rates at which they can carry information without undue distortion. The mathematical expression of this limit, known as Shannon's Theorem, defines this theoretical maximum in terms of the bandwidth of the channel and the signal-to-noise ratio of the transmission. Assuming a given channel with a fixed bandwidth, efforts to increase the transmission rate over the channel must be directed toward increasing the signal-to-noise ratio. When facsimile systems are used to transmit copy which has tonal property such as a picture, the analog output of the facsimile transmitter makes relatively full use of the bandwidth of a telephone communication channel. However, when the copy has a two level coloring, with no intermediate shade, such as typographic material or line drawings, the output of the transmitter makes relatively inefficient use of the capacity of the phone channels so that a relatively low transmission speed or a high distortion lever is realized. Accordingly, the time required to transmit this "hard" facsimile copy over a telephone line substantially exceeds the time which might be required if the channel capacity were more fully utilized.

We are aware of attempts to increase the transmission rate of facsimile data over a given channel by redundancy removal and data compression. These techniques have worked well when high signal-to-noise ratios were obtainable but have tended to increase the distortion to unacceptable levels when used with telephone channels and the like wherein only relatively low signal-to-noise ratios are obtainable.

SUMMARY OF THE PRESENT INVENTION

The present invention contemplates a system of facsimile reproduction wherein the analog output of the facsimile transmitter is digitized and suitably processed at the transmitting end and reprocessed at the receiving end so as to achieve transmission rates which are much closer to the theoretical maximums for given communication channels as set forth by Shannon's Theorem than were obtainable by devices formed in accordance with the prior art. The processing employed by the present invention is directed to three ends: (1) minimizing the error rate in a transmission over the communication channel at any given speed; (2) transforming those errors which necessarily do occur during the transmission process to a form in which they may be economically detected and corrected at the receiver end; and (3) to detecting and correcting such errors.

While facsimile transmissions share many concepts with the more common transmission of digital data representing encoded alphabetical or numerical information, they differ significantly from these transmissions in the manner in which error introduced by the communication channel affects the output of the system. Transmissions of signals representing numerical and alphabetical data are plagued equally by the two broad classes of errors which may be introduced in the communication channel. These errors are "random" and "burst." The random errors are those which are spread over the communication in a statistically uniform fashion and result from Johnson noise, etc. Random errors are seldom likely to affect a plurality of adjacent bits in a digital sequence, but rather affect scattered and isolated bits. Burst errors are those introduced to the system by switching transients, crosstalk, lightning, and the like and affect groups of adjacent bits. Either of these error types can so distort a numerical or alphabetical transmission as to completely alter the meaning of the message. However, in a facsimile system, unless the random error rate reaches an unusually high level, i.e. greater than one percent, for example, of the digits transmitted being received in error, the resulting facsimile copy will be perfectly legible. This is because the random errors will simply result in small dots on the sheet which will not normally affect the pattern recorded by the human eye when reviewing the copy. The integrating property of the eye is such as to tend to ignore the small random errors. On the other hand, the quality of facsimile transmission used is strongly affected by burst errors since these will tend to distort the copy in a manner which will be readily noted by the eye. Thus, in a facsimile transmission a given number of errors may be damaging to the copy if they occur in a burst, but not noticeable if they occur as random errors.

The present invention therefore encodes the transmitter output and decodes the received signal in such a manner as to minimize the total error and to channel what would otherwise be burst error into random errors.

The present invention achieves these objects through use of a plurality of techniques which cooperate with one another to produce a transmission system for facsimile data capable of providing significantly higher transmission rates than were obtainable in systems of the prior art when used over the same communication channels.

As exemplified in the subsequent detailed description of the preferred embodiment of the invention, one of these techniques consists of redundantly encoding at the transmitter end and decoding at the receiver end to detect and correct errors introduced in the transmission channel. At the transmitter end the serial digitized facsimile signals are treated as if they were the coded version of a message and are encoded in a redundant form by generating, in a convolutional encoder, a series of parity or check bits which are each a function of the state of the basic message at a plurality of times and adding these to the basic message signal. At the receiver end the data is passed through a special form of sequential decoder which has a high capability for detecting and correcting random errors introduced in the transmission. The sequential decoder is of a special type which is extremely simple in comparison to previous devices of this class and which has the capability of resynchronizing itself to a transmission in the event that it detects but cannot correct an error sequence, in contrast to previous devices which have required either a termination of transmission before they could be resynchronized or large buffer storage capacity at the receiver end to store received data while resynchronization takes place.

In order to insure that errors reaching the decoder are of a random nature rather than burst errors, the transmitter includes mechanism for reorganizing the encoded message to be transmitted so that consecutive bits which are transmitted are taken from widely separated points of the message. At the receiver the data is reorganized in its proper sequence. Through use of this "interleaving" technique in the event that a sequence of digits of the transmitted message are distorted during transmission to produce a burst error at the input to the receiver the regrouping distributes these lost digits so as to convert them into an effective random error which can be corrected by the sequential decoder.

A further technique employed in the preferred embodiment of the invention to avoid burst errors involves the actual transmission of the message in the form of pulse width modulation wherein a pulse may have one of a plurality of widths and each width is associated with a plural bit word of encoded message which is to be transmitted. This digital-to-pulse width conversion is performed using the Gray code whereby each pulse width represents 1 plural bit word and the words associated with adjacent pulse widths differ from one another by no more than 1 bit. In this manner even though a transmitted pulse width is decoded improperly at the receiving end, the improper code word should differ from the proper code word by no more than a bit or two, again avoiding the imposition of burst errors on the convolutional decoder.

By thus distributing burst errors into random errors and detecting and correcting random errors the system eliminates errors from the transmission and allows substantially higher transmission speeds to be employed than were obtainable with prior art systems.

Other objects, advantages and applications of the present invention will be made apparent by the following detailed description of the preferred embodiment of the invention. The description makes references to the accompanying drawings in which.

Figure 1:
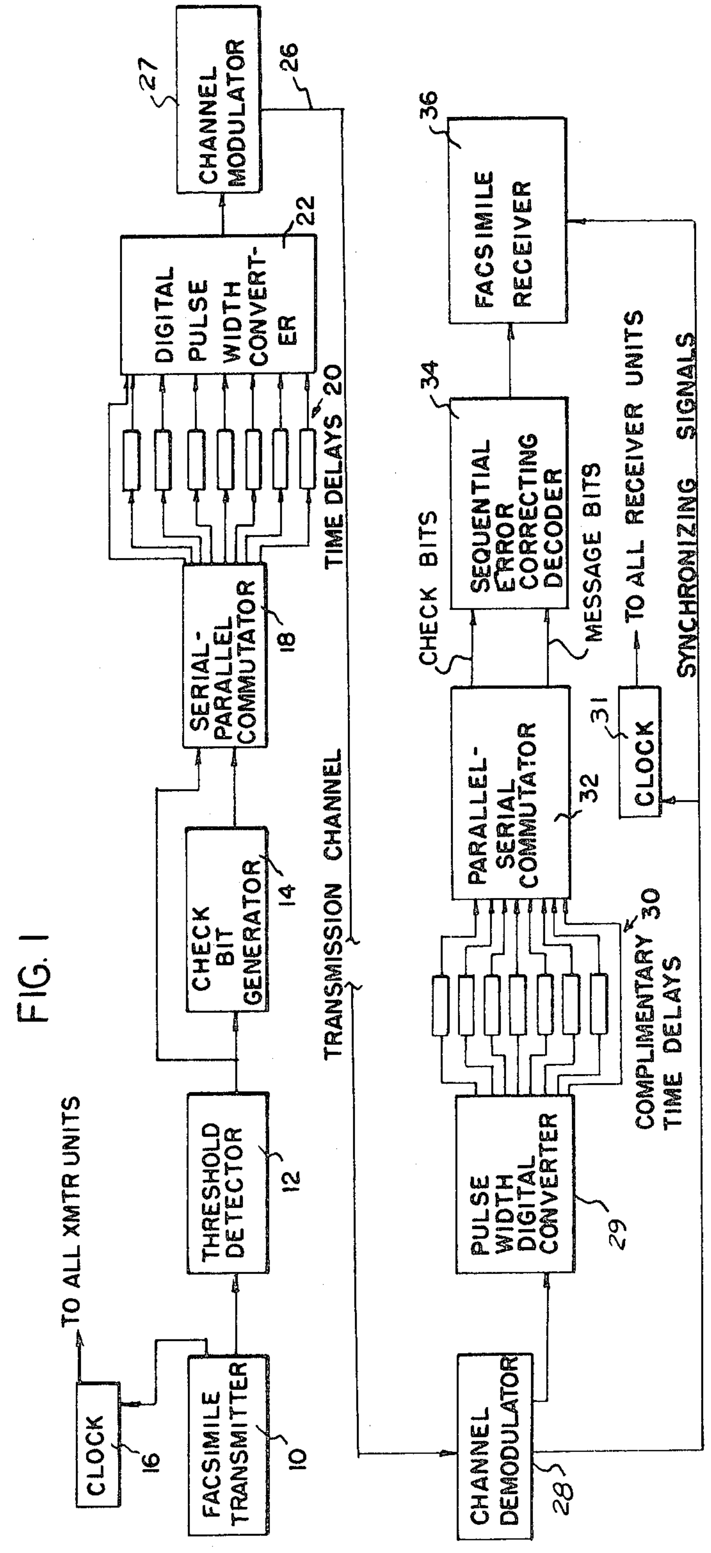
FIG. 1 is a block diagram of a preferred embodiment of the invention constituting a facsimile system wherein the transmitter and receiver are connected by a telephone line.

The preferred embodiment of the invention will first be disclosed in connection with the overall block diagram of FIG. 1 and the more novel blocks will than be discussed in greater detail. A transmitter formed in accordance with the preferred embodiment passes the analog output of a conventional facsimile transmitter 10 through a threshold detector 12 to convert it into a direct current voltage having a first level at such times as the amplitude of the analog input exceeds the threshold magnitude and a second level at all other times. The output of the threshold level detector is provided to a convolutional encoder check bit generator 14. Gating at the input to the generator 14, conditioned by a transmitter clock 16, effectively samples the two level signals at regular intervals to convert it into a series of binary pulses or "bits." The unit 14 acts to generate a sequence of parity or check bits which each represent the modulo 2 sums of the binary values of certain of these input bits, with each check bit being related to a plurality of input bits.

The sampled bits, which will hereinafter be termed "-message" bits, and the check bits are provided to a serial-to-parallel commutating switch 18 having two input terminals and eight output terminals. The switch accepts bits alternately from the two input lines and provides them sequentially to the eight output lines. The check bits are provided to one input terminal and the message bits to the other. Seven of the output terminals of the switch are connected to seven delay units 20 each of which provides a different time delay which is an integral multiple of the clock period between bits. By action of the commutator 18 a series of three incoming message bits are sequentially provided to three of the delay lines and a series of four incoming check bits are sequentially provided to the other four delay lines. The outputs of the delay lines which simultaneously occur and the fourth message bit which occurs at the same time will therefore be selected from a much larger number of message and check bits.

The outputs of the delay lines and the fourth message bit are treated as an 8-bit message word and are provided to a digital-pulse width converter 22. The output of the generator is one of 256 or $2^8$ possible widths depending on the configuration of the input word. A Gray code is used in the conversion so that a linear relationship exists between an 8-bit message sequence and the width of the pulse produced, in the sense that any chosen pulse width relates to a particular word having an unique pattern of ones and zeros, and pulse widths adjacent to the chosen one are related to other words which differ from that pattern in only one digit.

The pulse width converter 22 employs a chain of flip-flops connected to count in the binary scale. Gating conditioned by the states of the counter elements and the digits of a message sequence control the start time of a pulse and the pulses all end at the occurrence of the same predetermined state of the counter, which begins counting anew for each conversion. The gating configuration is such as to provide the Gray code relationship between the message sequence and the output.

These controlled width pulses are provided to a channel modulator 27 which provides an output signal of one of two frequencies, depending upon the instantaneous level of its input.

At the receiver the message is first provided to a demodulator 28 which converts the F.M. signal received from line 26 back into a DC signal. This output is then reconstructed into the transmitted word by a pulse width-to-digital converter 29. The converter essentially comprises a plurality of two state counter elements connected to count in the binary code. A rapidly switching signal from a clock 31 is sent to the counter at the start of each pulse and is continued for the duration of the pulse. A matrix within the converter translates the outputs of the counter into an 8-bit parallel word using the same Gray code employed in the transmitter. In the absence of errors introduced in the communication channel, the word at the output of the matrix will exactly duplicate the message word generated in the transmitter at the output of the delay lines.

Seven of the eight bits of the reconstructed message word thus formed then pass through seven delay lines 30 which are complementary to the delay lines which their equivalent bits passed through at the transmitter end. Thus, a total delay for a bit at both the transmitter and receiver ends may be 0.35 seconds. At the transmitter end seven bits of a word may have been passed through delays of 0.05, 0.10, 0.15, 0.20, 0.25, 0.30, and 0.35 seconds, respectively, while the eighth bit was not delayed at all. At the receiver end the bits will be passed through delays equal to 0.35 seconds minus the delay through which its equivalent bit was passed at the transmitter end. By way of example, the bit in the equivalent position in the receiver to the bit which was passed through a 0.15 second delay in the transmitter is passed through a 0.20 delay. This rearranges the bits in the original form which they had before passing through the delays at the transmitter end.

The outputs of the delays are then commutated with a switch 32 which is complementary to the one used at the transmitter end to develop independent serial trains of message bits and check bits. Each bit group is passed into its own shift register forming part of a decoder 34 and the states of the counter elements contained in the received message bits are used to regenerate the check bits which would be appropriate for that message bit group by a circuit resembling that used in the convolutional encoder in the transmitter end. These "generated" check bits are then compared with the received check bits. If no errors have been introduced in the communication channel an exact identity will be noted between the two groups of bits. However, any errors introduced in the transmission channel will produce discrepancies between the received check bits and the generated check bits. An error in a check bit will only produce a single discrepancy, but an error in one of the message bits will produce a plurality of discrepancies because each received message bit is used to derive a plurality of generated check bits. Accordingly, when the number of discrepancies exceeds a chosen level it is assumed that an error exists in one of the received message bits and a series of modifications are made in the message bits in accordance with a predetermined pattern until the discrepancies between the check bits and the message bits decreases below the chosen level.

This process is a continuous one and as a decoded message bit is shifted out of the message bit counter chain a new message bit is introduced at the other end of the chain. Each time a message bit is moved out, a sum is added to the check bit register which depends upon the binary state of the bit. This must be done since the check bits generated at the transmittal end are a function of all previous message bits which have passed through the encoder and accordingly the check bits at the receiver must be modified as a function of the same previous states of the receiver.

The outputs of the message bit counter chain in the receiver are provided to the pen of the facsimile receiver 36. The pen is moved in synchronism with the transmitter scanner and synchronism is maintained between the two by signals derived from the transmitted message.

If an isolated incorrect message bit occurs at the output of the message bit storage register, no effect will be produced in the reproduced message, because of the integrating properties of the eye as previously noted. However, the modifications which are made to the contents of the check bit register upon the emission of each corrected message bit may produce an avalanche of errors in the subsequent outputs of the decoder.

In order to prevent this, means are provided for inhibiting the operation of the decoder when the number of discrepancies between the generated check bits and the received check bits exceed a predetermined level for a predetermined length of time. At such times the data simply flows through the decoder and the unmodified outputs of the message bit shift register are provided to the facsimile receiver. After a short time, the decoder resumes operation and the contents of the check bit register are adjusted to agree with the generated check bits to return the decoder to synchronism.

Now considering each of the views disclosed in block in FIG. 1 in detail, the facsimile transmitter 10 may be of any conventional variety which scans copy with a photoelectric detector to provide an output signal. Those units which have a built-in threshold detector so that their output is a DC waveform having one of two levels depending upon the shade of the point immediately being scanned do not require an additional threshold detector 12. However, facsimile transmitters 10 generally provide an analog output signal having an amplitude which may range between two fixed levels such as 0 and 6 volts, depending upon the shade of the point being scanned. A typical unit of this type is manufactured by Telautograph Company of Los Angeles, California.

The threshold detector is operative to receive the analog signal and digitize it by providing a binary output signal having one level when the input signal is above a predetermined amplitude, and the other level when the input signal is below that amplitude. A circuit of this type is described in *Pulse and Digital Circuits* by Millman and Taub, McGraw Hill Book Company, 1958, at Page 431. An output of one level from the threshold detector 12 may signify that a black point is being scanned and an output of the other level that a white point is being scanned.

The check bit generator 12 or encoder receives the digitized facsimile output from the threshold detector 12 and effectively samples it at regular intervals and enters sequential samples into a five stage shift register 50. Shift pulses for the register are obtained from the clock 16 and either a one or a zero is emitted to the first stage of the register 50 upon the occurrence of each clock pulse, depending upon the instantaneous level of the output of the threshold detector 12 at that time. Upon the occurrence of each clock pulse, the contents of the register are advanced one stage. The outputs of the fifth stage of the register are simply discarded.

The first, second and fifth stages of the register provide input to a modulo 2 adder 52. The adder 52 provides an output pulse when pulses appear simultaneously on an odd number of its inputs and no output if the pulses appear at an even number of its inputs. Such adders are commonly employed in the computer art. Accordingly, the outputs of the modulo 2 adder 52 are each a function of three bits of information dispersed along a message and may be employed in the decoder to detect and correct errors introduced into the message in the transmission process.

Figure 3:
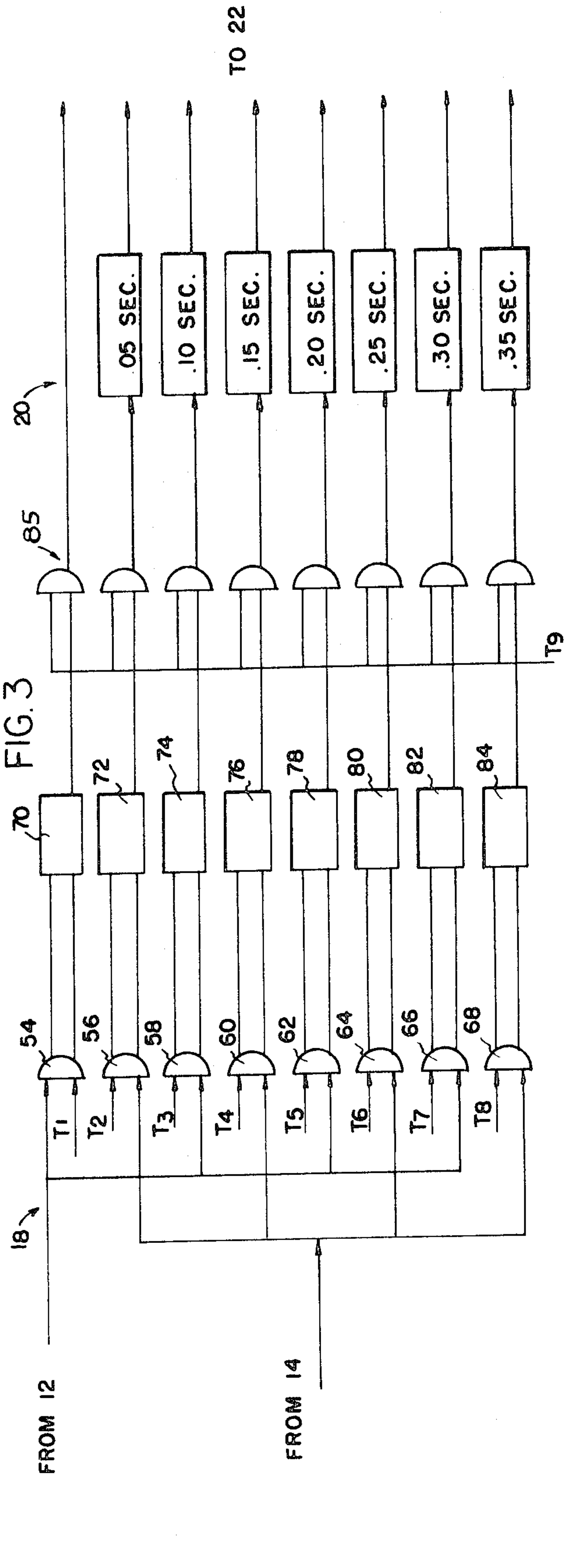
FIG. 3 is a partially schematic, partially block diagram of the serial-parallel commutator and delay line interleaver employed in the preferred embodiment of the transmitter.

The serial-to-parallel commutator 18 is disclosed in schematic form in FIG. 3. It includes an array of eight AND gates 54, 56, 58, 60, 62, 64, 66, and 68. Each of the AND gates provides output to one of eight flip-flops 70, 72, 74, 76, 78, 80, 82, and 84. The clock 16 generates a series of eight sequentially appearing clock pulses, $T_1$—$T_8$ at the basic clock rate of the system. One of these timing pulses is applied to each of the AND gates 54—68, respectively, so as to sequentially activate them. The odd AND gates 54, 58, 62, and 66, each having inputs of the basic message bits from the threshold detector 12. The even AND gates 56, 60, 64, and 66 have inputs from the check bit generator 14. This arrangement acts to store a series of four sequential message bits and the four check bits generated from the sequential message bits in the flip-flops 70—84, during eight clock times, with the check bits interlaced between the message bits.

The outputs of the flip-flops 70—84 are provided in parallel to the eight delay lines 20 which have delays ranging from 0.05 seconds for the unit which accepts the output of the flip-flop 70 to 0.40 seconds for the unit which accepts the flip-flop 84, with 0.05 second increments inbetween. The delay units 20 are preferably flip-flop storage registers of an integrated circuit variety.

Figures 2, 4:
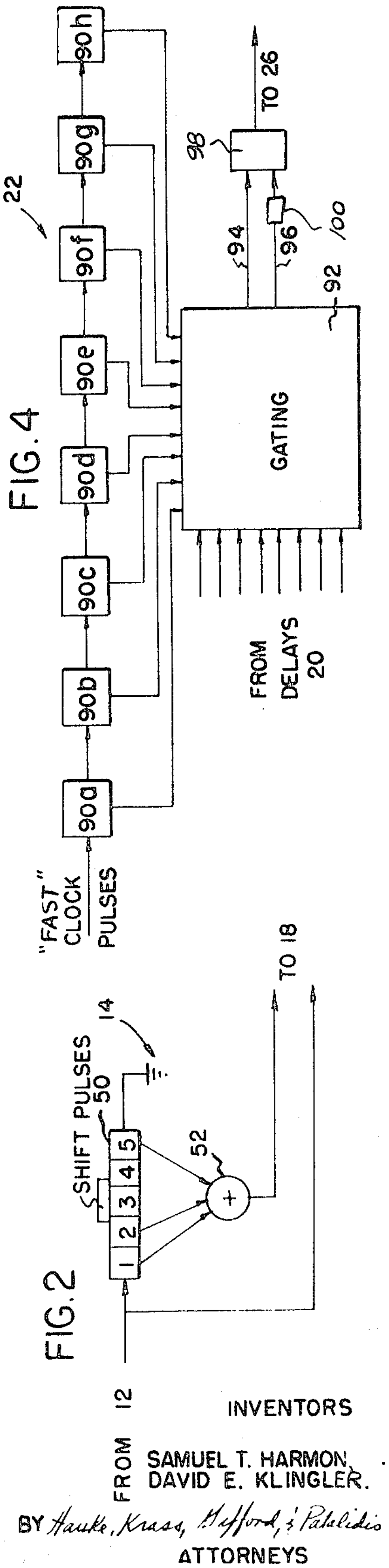
FIG. 2 is a partially schematic, partially block diagram of the redundant encoder employed in the transmitter.
FIG. 4 is a block diagram of the digital-pulse width converter employed in the transmitter of FIG. 1.

The digital-pulse width converter 22 is illustrated in more detailed block form in FIG. 4. It employs a dividing counter chain consisting of eight flip-flops 90*a*—90*h*. The input to the flip-flop chain is a series of clock pulses which occur at a rate which is 32 times the rate of the clock pulses provided to the balance of the system. These pulses are fed into the flip-flop 90*a* and its output is fed in 90*b*, etc., so that the flip-flops change states at binary related rates, with the flip-flop 90*h* changing state every 128 "fast" clock pulses.

Each of flip-flops 90*a*—90*h* is connected to a gating matrix 92 as are the outputs of the delay units 20. The matrix has a pair of output lines 94 and 96. The matrix has such a configuration that a pulse appears on the line 94 at a time after the beginning of the new cycle which is dependent upon the states of the outputs of the delay lines 20. For each particular sequence of conditions of the outputs of the delay line 20, the time of appearance of the beginning of the pulse with respect to beginning of the cycle is different. Thus, the pulse may begin at any one of 256 time periods after beginning of the cycle. The relationship between the pulse sequences at the outputs of the delay lines and the time of initiation of the pulse on line 94 is such that the code words associated with a pair of pulse start times which differ from one another by only one increment, will differ from one another by only one digit. This assures that a minimum distortion will be produced at the receiver in the code word if during the transmission process a pulse width is distorted so that it is read as another pulse width at the receiver.

The output on line 94 is provided to a flip-flop 98 to initiate an output pulse from the flip-flop which is sent to the channel modulator 27. The flip-flop is reset upon receiving an output from the delay line 100 which receives an input at such time as the gating unit 92 provides an output on line 96. This occurs when all of the flip-flops 90*a*—90*h* are in their reset state. The delay line 100 insures that even the shortest pulse will have a sufficient pulse width to be detectable at the receiving end.

Thus the converter 22 produces pulses which are initiated at a time between a pair of clock times dependent upon the message word provided by the delay lines 20, and which all end at the same time within that time period and thus have a pulse width which is a function of the particular code word.

These pulses are provided to a channel modulator 27 which is preferably a digital-frequency converter providing outputs of one of two frequencies depending upon the digital condition of its input. The modulator 27 in the transmitter and the demodulator 28 in the receiver may constitute Bell Telephone System 602 Modems.

Figure 5:
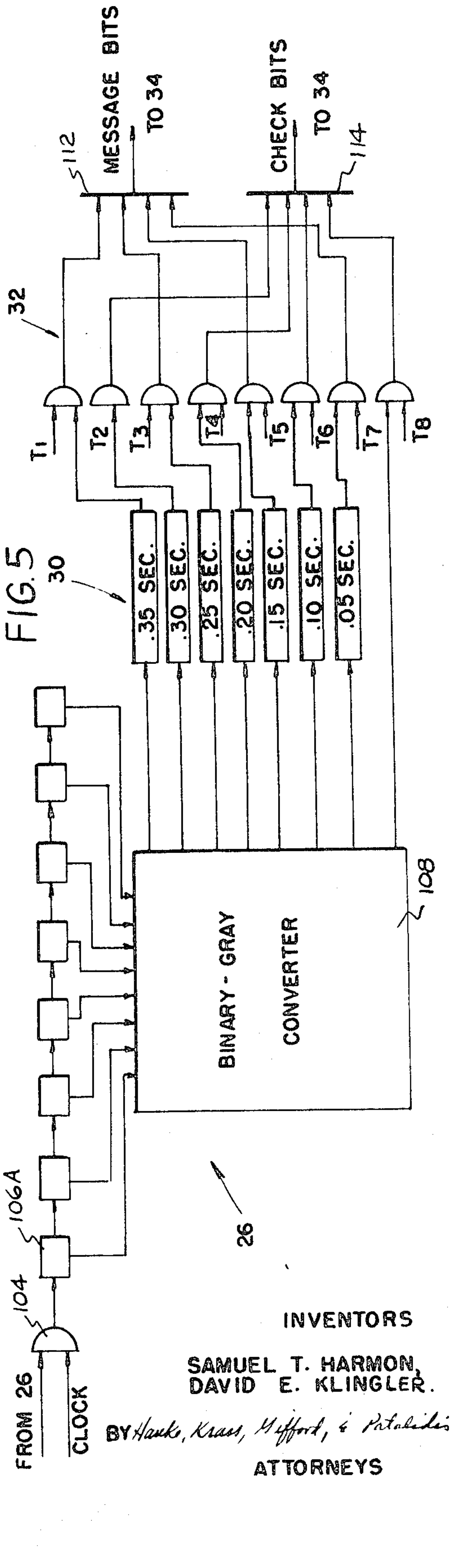
FIG. 5 is a partially schematic, partially block diagram of the pulse width-digital converter, and deinterleaver and parallel-serial commutator employed in the receiver of the preferred embodiment of the invention.

At the receiver end the frequency modulated carrier is first passed through the demodulator 28 which regenerates the DC signal appearing at the output of the converter 22 and this signal is provided to gate 104 within the pulse width-digital converter 29 illustrated in FIG. 5. The gate 104 is also conditioned by a clock signal which occurs at the same rate as the "-fast" clock signal which feeds the binary scaling chain 90*a*—90*h* and is generated by the receiver clock 31. The receiver clock is synchronized with the transmitter by the trailing edges of the F.M. pulses which occur in synchronism with the transmitter clock.

The output of the gate 104 is provided to each stage of a binary counter chain 106*a*—106*h*. This chain thus counts at the "fast" clock rate during the period of the occurrence of a transmitted pulse which is derived from the output of the flip-flop 98. The outputs of each of the stages of the counter chain 106 are provided to a binary-Gray converter 108 operative to convert the count maintained in the flip-flops 106 at the end of a pulse time into a Gray code configuration. The converter 108 also contains a delay to compensate for the delay 100 in the transmitter. This effectively reconstructs the pulses which simultaneously appear at the outputs of the delay lines 20 in the transmitter, modified only by any errors introduced during the transmission process.

Seven of the eight outputs of the converter 108 are passed through delay lines 30 operative to provide differing delays complementary to the delays which the equivalent pulses went through in the delay lines 20 of the transmitter. Thus, the output of the flip-flop 70 in the transmitter was not passed through any delay line and at the receiver it is passed through a 0.35 second delay line. At the other extreme the output of the flip-flop 84, which occurred at the last time period in the eight pulse cycle, was passed through a 0.35 second delay in the transmitter and its equivalent is not passed through any delay in the receiver. The intermediate bits are passed through corresponding complementary delays in the receiver so that their total delay is 0.35 seconds. This effectively reorganizes the bits into the same parallel order which they had at the outputs of the flip-flops 70—84 in the transmitter.

The parallel word thus formed is regrouped into serial form and divided into two subsets by the parallel-serial commutator 32. The commutator employs eight AND gates 110*a*—110*h* which receive the outputs of the seven delay lines 30 and the eighth undelayed pulse from the converter 108 and respectively are conditioned by a sequence of eight timing pulses $T_1$—$T_8$. The outputs of the odd gates, those conditioned by $T_1$, $T_3$, $T_5$ and $T_7$, are summed by an OR gate 112 to reconstitute the four message bits of the 8-bit word sequence. The four check bits in the sequence are similarly summed by an OR gate 114 which receives the outputs of those AND gates 110 conditioned by $T_2$, $T_4$, $T_6$ and $T_8$.

Figure 6:
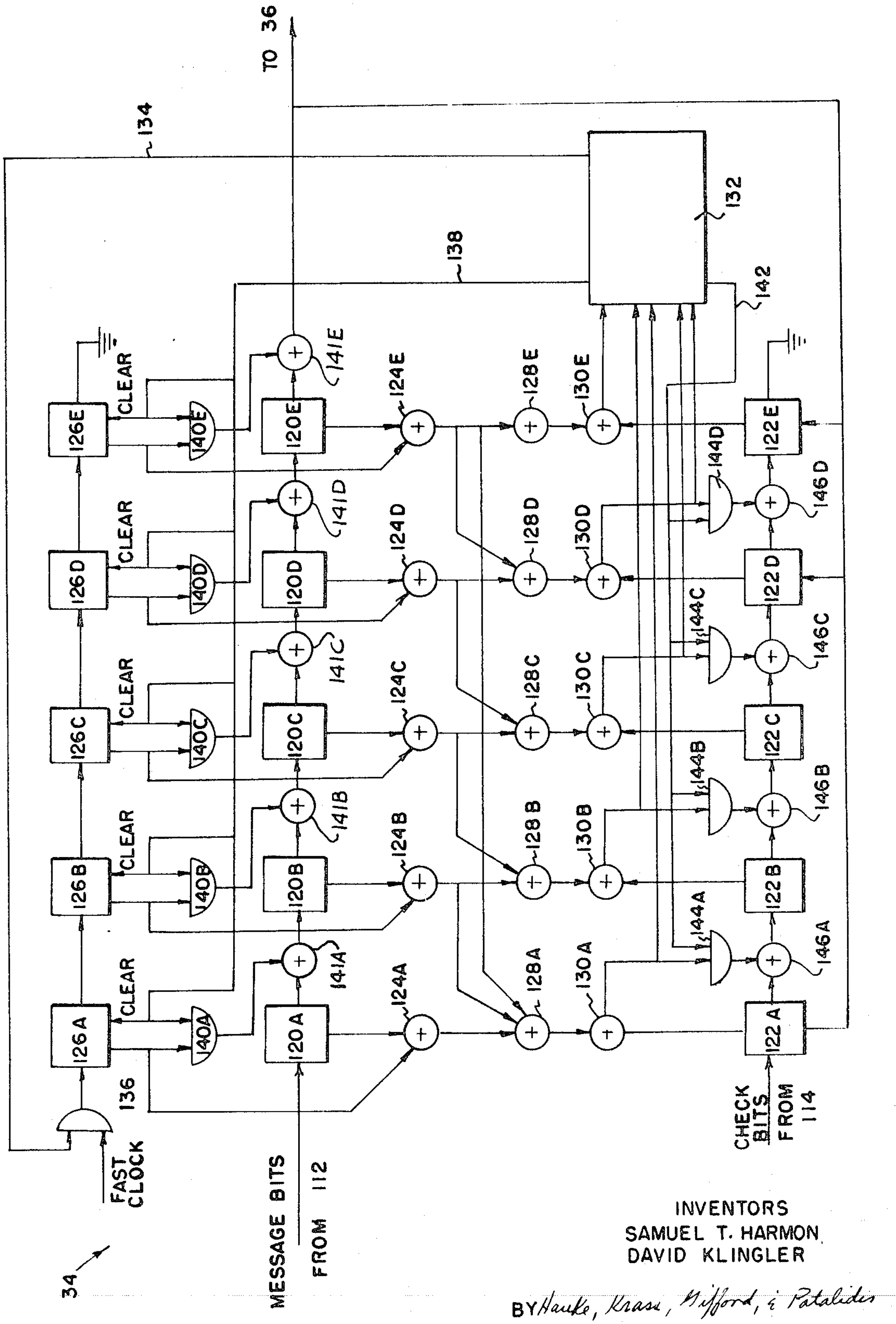
FIG. 6 is a partially schematic, partially block diagram of the sequential error correcting decoder employed in the receiver of the preferred embodiment of the invention.

Both the message bits from gate 112 and the check bits from gate 114 are entered into the sequential error decoder 34, shown in detail in FIG. 6. The message bits are entered into the first stage, 120*a*, of a five stage flip-flop shift register 120*a*—120*e*. This will be termed the "message bit" shift register. Similarly, the check bits from OR gate 114 are entered into the first stage, 122*a*, of a 5-bit shift register 122*a*—122*e*, termed "check bit" shift register. Although the clock connections to the shift registers are not shown, each is operative to shift its contents one stage to the right upon the occurrence of pulses from the clock 31.

The outputs of the message bit shift register stages 120*a*—120*e* are provided to five modulo 2 adders 124*a*—124*e*. These adders each have an additional input from one of the stages of a five stage "modification register" 126*a*—126*e*. The operation of that register and its effect upon the modulo 2 adders 124*a*—124*e* will be subsequently discussed but for purposes of elucidation assume that no pulses appear on any of these secondary inputs to the modulo 2 adders 124 and that their outputs are accordingly the same as their inputs. These outputs of the modulo 2 adders 124*a*—124*e* are respectively provided to five additional modulo 2 adders 128*a*—128*e*. The modulo 2 adder 128*a*, in addition to its input from modulo 2 adder 124*a*, has inputs from the two modulo 2 adders 124*b* and 124*e*. The similarity between the five stage message bit register 120*a*—120*e* and AND gate 128*a*, both in the receiver, and the equivalent transmitter units, shift register 50 and modulo 2 adder 52 both in the check bit generator 14, should be noted. Both the modulo 2 adder 128*a* and modulo 2 adder 52 have inputs from the first, second and fifth stages of their associated shift registers. Thus, the register 128*a* effectively generates an internal check bit from the data contained in the first, second and fifth stages of the message bit register.

Assuming that no error was introduced into the message during transmission or processing before or after transmission, this output of the modulo 2 adder 128*a* should be the same as the check bit stored in the first stage, 122*a*, of the check bit register at that instant. In order to determine if this condition exists the output of the modulo 2 adder 128*a* is compared with the contents of the first stage of the check bit register 122*a* in another modulo 2 adder 130*a*. If the received check bit is in accord with the internally generated check bit provided by modulo 2 adder 128*a*, the inputs to the modulo 2 adder 130*a* will be even in number and it will provide an output. However, if the received check bit and the internally generated check bit differ from one another, the modulo 2 adder 130*a* will have an odd number of inputs and its output will be a "one."

Four other modulo 2 adders 130*b*—130*e* perform the same function for the check bits stored in the check bit register stages 122*a*—122*e*, with one exception; that is, all the information necessary to internally generate the check bits for these last four stages is not present in the message bit register 112. Thus, the modulo 2 adder 128*b* receives the output of the modulo 2 adder 124*b* which normally will contain the condition of the message bit register second stage 120*b*, and from the modulo 2 adder 124*c* which will normally provide the condition of the third stage of the message bit register 120*c*. However, the third input required to internally generate a check bit which should be the equivalent of that contained in the second stage of the check bit register 122*b*, is not present. This signal, the message bit which proceeded that contained in the register 120*b* by four stages, has been previously fed out to the facsimile transmitter 36 as the output of the fifth stage of the message bit register 120*e*.

In order to correct for this deficiency, and similar deficiencies which affect the production of the internally generated check bits from the last three stages of the decoder, each time a pulse output is provided to the facsimile receiver 36 from the last stage of the message bit register, a corresponding "one" is provided to check bit stages 122*a*, 122*d*, and 122*e* representing the first, fourth and fifth bit positions in the check bit register. This modifies the contents of these registers in such a way as to correct for the omission of previously emitted bits in later calculating the internally generated check bits, by effectively adding the signals representative of these bits into the check bit register. If no "one" is provided to the facsimile receiver 36 at a particular clock period no modification of the check bit stages is necessary.

In this manner the modulo 2 adders 130*b*—130*e* compare the outputs of the modulo 2 adders 120*b*—120*e* with the modified check bits contained in stages 122*b*—122*e* of the check bit register.

If no error has been introduced into either the check bits or the message bits provided from the OR gates 112 and 114 during the previous transmission or processing, and the five previous bits provided to the facsimile receiver 36 from the last stage of the message bit register 120*e* have been correct, the modulo 2 adders 130*a*—130*e* will not have any outputs. This is the normal mode of operation of the decoder and in this mode one message bit is provided from the last message bit register stage 120*e* to the facsimile receiver 36 at each clock time, the output of the last check bit register stage 122*e* is passed to ground, and new signals are provided to the first stages of the message and check bit registers from the gates 112 and 114 respectively.

If, however, one of the check bits has been distorted in transmission and the message bits used to internally generate that message bit are all correct, the modulo 2 adder 130 which is associated with the stage containing that incorrect check bit will produce an output. If this is the only incorrect check bit or message bit in the system that would be the only output from one of the modulo 2 adders 130. On the other hand, if an incorrect message bit is contained in say the last stage of the message bit register 120*e*, it will affect the comparisons made by three of the modulo 2 adders 130*a*, 130*d* and 130*e* and this will produce three outputs from the modulo 2 adders 130. Similarly, incorrect message bits in any of the stages 120*b*, 120*d* will produce two errors in comparison while an incorrect message bit in stage 120*a* will produce a single error if it occurs alone.

The outputs of all the modulo 2 adders 130*a*—130*e* are provided to an error detection network 132 within the decoder. The network 132 acts to generate voltages having an amplitude proportional to the number of modulo 2 adders 130*a*—130*e* which have detected discrepancies between the internally generated check bits and the received check bits, and to gate pulses out of one or more of several output lines under control of such voltages.

Upon receiving outputs from two of the modulo 2 adders 130, indicating that two of the comparisons have detected errors, the network 132 provides a signal on line 134 to an AND gate 136. The other output of the AND gate is conditioned by a "fast" clock signal. The output of the AND gate 136 is provided to the first stage of the five stage modification register 126*a*—126*e*. The stage 126*a* provides an output to the modulo 2 adder 124*a* which effectively sums this signal with the output of the message but register stage 120*a*. If an incorrect message bit in stage 120*a* has been part of the source of the error noted by the unit 130, this modification will reduce the two stage error to a one stage error. At this point unit 132 will send out a signal in line 138 to the five AND gates 140*a*—140*h* which connect the outputs of the modification register stages 126*a*—126*e* to the message bit register stages 120*a*—120 *e*. The "one" contained in stage 126*a* will then be added into the message bit stage 120*a* effectively making permanent the modification which corrected the erroneous result. Since zeros are contained in the modification register stages 126*b*—126*e*, no equivalent modifications will be made to the message bit register stages 120*b*—120*e*. At the same time the signal on line 138 will clear the modification register states.

If the "one" in the first stage of the modification register did not affect a reduction in the errors noted by the modulo 2 adders 130 to the 1-bit level, the "one" in register 126*a* will be shifted to the second stage of the modification register 126*b* on the next "fast" clock pulse as the shifting of the modification register is controlled by these pulses. No additional pulses would be added into the first stage of the register since the pulse on line 136 is only present for one "fast" clock period. The "one" contained in the second stage of the modification register 126*b* will be added to the contents of the second message bit stage 120*b* through the modulo 2 adder 124*b*. Again, if this modification reduces the error below the level of two, the pulse will be sent out on line 31 to the AND gate 140*b*, making this correction a permanent one.

This sequence continues until the error is reduced to one or the pulse has been shifted through the last stage of the modification register 126*e*, without reducing the error level to one. If that occurs it signifies that the error detected by the modulo 2 adders 130 is too large for the system to correct. In that event the unit 132 provides an output pulse on line 142 which lasts for five clock periods. Line 142 connects to four AND gates 144*a*—144*d*. Each of these AND gates is conditioned by its associated modulo 2 adder 130. These AND gates provide outputs to four modulo 2 adders 146*a*—146*d* which connect their respective check bit register states 122*a*—122*d* with the next succeeding check bit register stages 122*b*—122*e*, respectively.

During this five clock bit period no output signals are provided on line 134 to the modification register 126*a*—126*e*. Accordingly, during that time the unmodified contents of the message bit register are shifted out to the facsimile receiver 36. Some of this information is probably erroneous, but this is an emergency procedure used to clear the decoder of errors and should very rarely occur in practice.

At the end of the 5-bit period the AND gates 144*a*—144*d* will cause the check bit registers 122*b*—122*e* to contain values which will cause no output from the modulo 2 adders 130*b*—130*e* on the next clock period since it will modify the check bit signal from the previous stage only if an incorrect parity check is noted. Again, while one or more of these check bits may be erroneous, the probability of this occurring is extremely small. The encoder 14 and the decoder 34 described employ a "constraint length" of five bits; that is, a particular bit in the encoded message has a relation to other bits in the message which are no more than four message bits displaced from it within the message. Longer constraint lengths could easily be employed by extension of the principals of this preferred embodiment. Such longer constraint lengths would allow the correction of more than one bit within the decoder.

The code illustrated transmits one check bit for each message bit. Such a code is said to have "rate" of one-half; that is, the message bits constitute one-half of the encoded bits transmitted. If longer constraint lengths were employed codes of higher rates such as two-thirds or three-quarters might be employed, thereby increasing the efficiency of the system. The particular constraint length and code configuration described are only intended to be illustrative of a preferred embodiment.

While the decoding system illustrated has certain novel aspects which are considered to be inventive, and cooperates with other aspects of the system in an inventive manner, other embodiments of the invention might employ different forms of decoders such as those disclosed in the copending application of which this application constitutes a continuation-in-part, or others known to the art.

Although we have described several embodiments of our invention, it will be apparent to one skilled in the art to which the invention pertains that various changes and modifications may be made therein without departing from the spirit of the invention or the scope of the appended claims.

Having thus described our invention, we claim:

1. A facsimile reproduction system including, in combination:

a facsimile transmitter operative to scan a sheet of original copy to generate an electrical signal having a characteristic which is a function of the graphic content of the point on the copy being instantaneously scanned; means for accepting said electrical signal and for sampling it at regular intervals to provide a serial digital signal wherein each digit has a characteristic which is a function of said characteristic of the electrical signal at a particular instant; means for forming a plural parallel digit word wherein at least certain of the digits represents one of the digits of said serial signal; means, under control of said parallel signals for generating a transmission signal which has a characteristic which may assume any one of a series of states, the states being related to the words in such a way that words representative of adjacent states differ from one another by no more than one digit; a transmission channel operative to receive said transmission signal; a converter operative to receive the transmission signal from the transmission channel at a location remote from the transmitter and to reconstruct the serial digital signal from it; and a facsimile receiver having an output member operative to scan a sheet in synchronism with the transmitter scan, the condition of said output member being controlled by the instantaneous state of said reconstructed serial digital signal to operate on the sheet to create a facsimile of the original copy.

2. The facsimile reproduction system of claim 1 wherein said characteristic of said serial digital signal may assume one $n$ state, wherein said plural parallel digit word contains $m$ digits and wherein said characteristic of the transmission signal may assume any one of $n^m$ states.

3. The facsimile reproduction system of claim 2 wherein said serial digital signal is a binary signal, and said characteristic of the transmission signal may assume any one of $2^m$ states.

4. The facsimile reproduction system of claim 1 wherein means are provided for passing each of the digits of the plural parallel digit word through one of a plurality of first delays of varying length prior to providing the word to the transmission channel; and means are provided for passing each of the digits of the reconstructed serial digital signal through one of a plurality of second delays before providing it to the facsimile receiver, the sum of the first and second delays through which a particular digit and its equivalent are passed being equal for all digits.

5. The facsimile reproduction system of claim 1 wherein certain of the digits of the parallel word have states which are a function of the states of a plurality of digits in the serial digital signal and the reconstructed serial digital signal is decoded into the form of the serial digital signal by detecting and correcting errors introduced into the transmission channel.

6. The facsimile reproduction system of claim 5 wherein each of the digits of the serial digital signal is passed through one of a plurality of first delays, and each of the digits of the reconstructed serial digital signal is passed through one of a plurality of second differing delays before being provided to the facsimile receiver.

7. The facsimile reproduction system of claim 6 wherein the state of the characteristic of the transmission signal is related to the plural digit parallel word in accordance with the Gray code.

8. The facsimile reproduction system of claim 1 wherein said characteristic of the transmission signal which may assume any one of a series of states constitutes the widths of pulses, one of which is formed under control of each plural digit parallel word, and wherein the widths of said pulses may assume any one of a series of states, the states being related to the parallel words in such a way that words representative of pulses which are immediately adjacent to one another in width differ from one another by no more than one digit.

9. The facsimile reproduction system of claim 8 wherein said means for generating a transmission signal includes a counter chain, a two state element, and means for changing the state of the two state element upon the occurrence of a selected condition of the states of the counter chain.

10. A facsimile reproduction system including, in combination:

a facsimile transmitter operative to scan a sheet of original copy to generate an electrical signal having a characteristic which is a function of the graphic content of the point on the copy being instantaneously scanned; means for accepting said electrical signal and for sampling it at regular intervals to provide a serial digital signal wherein each digit has a characteristic which is a function of said characteristic of the electrical signal; an encoder for generating a redundant signal having a greater number of digits than the serial digital signal, each digit of the redundant signal being the function of the condition of one or more of the digits of the serial digital signal; a transmission channel operative to receive said redundant signal; a decoder operative to receive the redundant signal from the transmission channel at a location remote from the transmitter and to reconstruct the serial digital signal from it; and a facsimile receiver having an output member operative to scan a sheet in synchronism with the transmitter scan, the condition of said output member being controlled by the instantaneous state of said reconstructed serial digital signal to operate on the sheet to create a facsimile of the original copy.

11. The facsimile reproduction system of claim 10 wherein the decoder operates to reconstruct the serial digital signal from the redundant signal by detecting errors in the redundant signal on the basis of inconsistencies between various of the digits of the redundant signal, and corrects at least certain of the errors so detected by reconstructing the serial digital signal so as to eliminate such inconsistencies.

12. The facsimile reproduction system of claim 11 wherein the encoder is of the convolutional type and the decoder is of the sequential type.

13. The facsimile reproduction system of claim 10 wherein the redundant signal contains all of the digits of the serial digital signal plus additional digits which are each a function of a plurality of digits in the serial digital signal.

14. The facsimile reproduction system of claim 13 wherein the decoder separates those digits which are a function of single digits in the serial-digital signal from the redundant signal and employs them to generate internal check digits which are compared with those digits of the redundant signal which are a function of a plurality of the digits in the serial digital signal, in order to detect errors in the redundant signal.

15. The facsimile reproduction system of claim 11 wherein means are provided for disabling the decoder upon the detection of certain classes of errors in the redundant signal.

16. The facsimile reproduction system of claim 10 wherein the digits of the redundant signal are arranged into parallel code words containing $m$ digits, each digit having one of $n$ states, means is provided for encoding such words into a transmission signal having $n^m$ possible states before provision to the transmission channel, and means is provided to decode such transmission signal into the redundant signal at the receiver location.

17. The facsimile reproduction system of claim 16 wherein adjacent states of the transmission signal are functions of code words which differ from one another by no more than one digit.

18. The facsimile reproduction system of claim 16 wherein means are provided for scrambling the digits of the redundant signal at the transmitter and regrouping them in their original orientation at the receiver.

19. A facsimile reproduction system including, in combination:

a facsimile transmitter operative to scan a sheet of original copy to generate an electrical signal having a characteristic which is a function of the graphic content of the point on the copy being instantaneously scanned; means for accepting said electrical signal and for sampling it at regular intervals to provide a digital signal wherein each digit has a characteristic which is a function of said characteristic of the electrical signal at a particular instance; delay means operative to receive said digital signal and to delay each various of its digits by one of a first plurality of differing delays so as to form an interleaved signal at the output of the delay means; a transmission channel operative to receive said interleaved signal; a complementary delay unit operative to receive said delayed signal from the transmission channel at a location remote from the transmitter and to pass each of the sequentially appearing digits of the interleaved signal through one of a plurality of second delay units of varying length, the sum of the delays provided to a particular digit at the receiver end and its equivalent at the transmitter end being the same for all of the digits; and a facsimile receiver having an output member operative to scan a sheet in synchronism with the transmitter scan, the condition of said output member being controlled by the instantaneous state of the serial digital signal appearing at the outputs of the complementary delay unit.

20. The facsimile reproduction system of claim 19 wherein the serial digital signal is arranged into a plurality of parallel digit words prior to being input to the delay means and is rearranged to serial form at the output of the complementary delay means at the receiver end of the system.

21. The facsimile reproduction system of claim 20 wherein the parallel output of the delay means is used to generate a transmission signal having one of $n^m$ states wherein $n$ is the number of states which a digit of the parallel digit word may have and $m$ is the number of digits in the parallel word and such signal having $n^m$ states is decoded at the receiver end before being input to the complementary delay unit.

22. A facsimile reproduction system including, in combination:

a facsimile transmitter operative to scan a sheet of original copy to generate an electrical signal having a characteristic which is a function of the graphic content of the point on the copy being instantaneously scanned; means for accepting said electrical signal and for sampling it at regular intervals to provide a digital signal wherein each digit has a characteristic which is a function of said characteristic of the electrical signal at a particular instance; delay means operative to receive said digital signal and to provide an output signal wherein the digits of the digital signal are arranged in a time sequence which differs from that of said digital signal; a transmission channel operative to receive the output of the delay means; a complementary delay unit operative to receive the signal from the transmission channel at a location remote from the transmitter and to operate upon such signal so as to effectively rearrange the digits thereof into their original sequence; and a facsimile receiver having an output member operative to scan a sheet in synchronism with the transmitter scan, the condition of said output member being controlled by the instantaneous state of the signal appearing at the output of the complementary delay unit.

23. The facsimile reproduction system of claim 22 wherein the serial digital signal is encoded in redundant form prior to provision to the delay means and is decoded at the output of the complementary delay means to detect and correct errors resulting from the transmission.